United States Patent [19]

Pieper et al.

[11] Patent Number: 5,449,537
[45] Date of Patent: Sep. 12, 1995

[54] HEAT-SHRINKABLE COMPOSITE FOIL

[75] Inventors: Detlef Pieper, Roedental Moenchr; Andreas Kupczyk, Hagen, both of Germany

[73] Assignee: RXS Schrumpftechnik Gartnituren GmbH, Hagen, Germany

[21] Appl. No.: 293,929

[22] Filed: Aug. 22, 1994

Related U.S. Application Data

[63] Continuation of Ser. No. 897,395, Jun. 12, 1992, abandoned.

[30] Foreign Application Priority Data

Jul. 22, 1991 [DE] Germany .................. 41 24 274.2

[51] Int. Cl.⁶ .................. B65B 53/02; B32B 31/20; B32B 31/22
[52] U.S. Cl. .................. 428/34.9; 428/76; 428/80; 428/81; 428/99; 428/200; 428/212; 428/345; 428/349; 428/516; 428/913; 174/DIG. 8
[58] Field of Search .................. 428/68, 76, 200

[56] References Cited

U.S. PATENT DOCUMENTS

| | | | |
|---|---|---|---|
| 4,631,098 | 12/1986 | Pithouse et al. | 174/DIG. 8 |
| 4,656,070 | 4/1987 | Nyberg et al. | 174/DIG. 8 |
| 4,798,752 | 1/1989 | McLoughlin et al. | 174/DIG. 8 |
| 4,929,477 | 5/1990 | Will | 174/DIG. 8 |
| 4,952,437 | 8/1990 | Winterhoff et al. | 428/68 |
| 4,952,438 | 8/1990 | Kipfelsberger et al. | 174/DIG. 8 |
| 5,171,617 | 12/1992 | Affolderbach et al. | 174/DIG. 8 |

FOREIGN PATENT DOCUMENTS

| | | |
|---|---|---|
| 42-14191 | 8/1967 | Japan . |
| 47-39490 | 12/1972 | Japan . |
| 47-42972 | 12/1972 | Japan . |
| 51-30886 | 3/1976 | Japan . |
| 51-17261 | 5/1976 | Japan . |
| 1497051 | 1/1978 | United Kingdom . |

*Primary Examiner*—Donald J. Loney
*Assistant Examiner*—Rena L. Dye
*Attorney, Agent, or Firm*—Hill, Steadman & Simpson

[57] ABSTRACT

A shrinkable composite section is formed from a shrinkable composite foil composed of at least two shrinkable planar foils adhering firmly to one another. Each of the two shrinkable foils has a shrink direction proceeding at a suitable offset angle relative to the shrink direction of the other individual planar foil so that the resulting overall shrink direction occurring for the composite foil extends between the shrink directions of the two individual foils. The tendency toward tearing or, respectively, continued tearing of the shrinkable composite foil section is, thus, diminished.

18 Claims, 2 Drawing Sheets

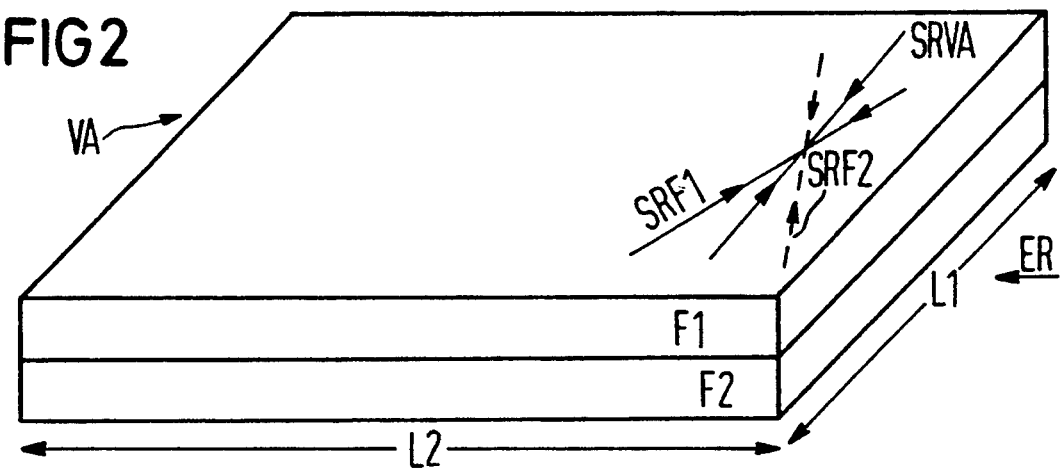
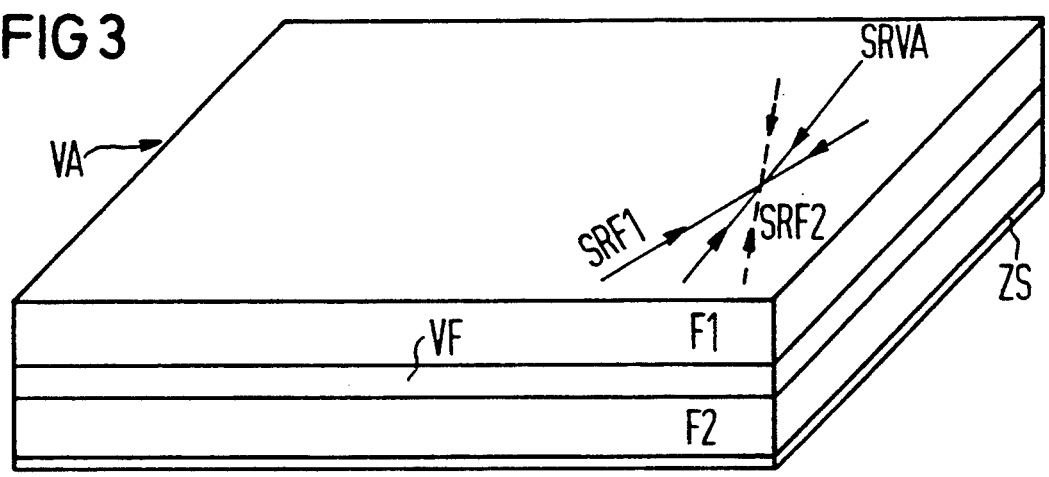
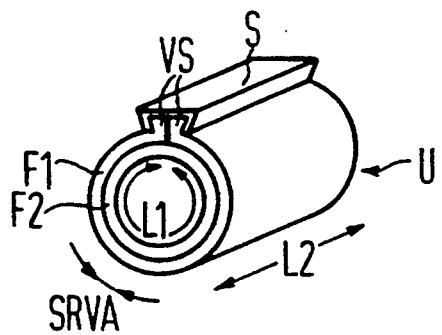

HEAT-SHRINKABLE COMPOSITE FOIL

This is a continuation of application Ser. No. 07/897,395, filed Jun. 12, 1992 which is now abandoned.

BACKGROUND OF THE INVENTION

The present invention is directed to a heat-shrinkable composite foil for the manufacture of tear-resistant envelopes, particularly for pipes, cables, cable connectors and the like.

A heat-shrinkable composite foil is disclosed in British Patent Specification 1 497 051, which was the basis of German GM 75 01 913. This Patent Specification describes a heat-shrinkable, tubular coupling sleeve that is composed of a single heat-shrinkable foil and of a meltable foil layer of hot-melt glue, wherein rod-shaped inserts are provided as reinforcing elements. These reinforcing elements are embedded in the form of mechanically rigid longitudinal rods that extend transversely relative to the shrink direction of the coupling sleeve and serve the purpose of reinforcing this envelope. In this way, the reinforcement elements do not impede the shrinking process. Protection against tearing or, respectively, continued tearing in the shrink direction is, thus, indeed, established. However, no reinforcement is obtained in a direction perpendicular thereto. Since the shrinking forces are effective here and pull the envelope farther apart, there is a high risk of tearing and/or continued tearing along a direction extending perpendicular to the shrink direction.

U.S. Pat. No. 4,952,437, whose disclosure is incorporated herein by reference thereto, and European Patent Application EP 0 299 439 disclose inclusion of grid-shaped reinforcing elements with which an attempt is, likewise, made to improve the resistance of shrinkable envelopes to tearing or, respectively, continued tearing. What is problematical in these embodiments, however, is that the shrinkability may be unfavorably influenced under certain circumstances.

SUMMARY OF THE INVENTION

An object of the present invention is to create a heat-shrinkable composite foil wherein the tendency to tearing or, respectively, continued tearing of envelope is suppressed. An improvement of the resistance to tearing or, respectively, continued tearing should particularly be improved in the direction that proceeds perpendicular relative to the shrinking direction.

This object is inventively achieved with a composite foil that has a first, shrinkable planar foil having a first shrink direction arranged with a firm adhesion on a second, shrinkable planar foil having a shrink direction deviating from the first direction by an offset angle so that the composite foil or, respectively, a composite foil section formed from this will have a resultant shrink direction lying between the shrink directions of the individual planar foils.

What is of great advantage in the heat-shrinkable composite foil of the present invention and the composite foil sections manufactured therefrom, for example for envelopes of pipes, cables, cable connections and the like, is that only identical composite materials that are self-shrinking are utilized. Thus, the actual impediment is not established as in the case with unshrinkable inserts. In such a composite foil, thus, a plurality of shrinkable planar foils, but at least two shrinkable planar foils, are brought together on top of one another with firm adhesion, whereby the shrink directions of these individual planar foils proceed at angles relative to one another. A resultant shrink direction for the entire heat-shrinkable composite foil will, thus, be provided. Since there is a tendency of tearing or, respectively, continued tearing in shrink products, particularly in a direction extending perpendicular vis-a-vis the shrink direction, a composite foil section is then cut from the composite foil so that the resultant shrink direction resides perpendicular to the tearing or, respectively, continued tearing direction under consideration. As a consequence of the structure of the composite foil, this means that the actual shrink direction of each planar foil no longer resides perpendicular vis-a-vis the tearing or, respectively, continued tearing direction under consideration, but at an angle thereto and that the prerequisite for tearing or, respectively, continued tearing is, thus, considerably alleviated. What is thereby important is that the resultant shrink direction of the entire composite foil proceeds parallel to the desired shrink direction, and generally parallel to the edge of the composite foil section that is shortened during shrinkage.

The individual planar foils are joined or bonded to one another with firm adhesion by means for bonding, for example by crosslinking the boundary surfaces or with heat-resistant glues or adhesives so that the planar foils have their different shrink directions deviating from one another forming a unit, even at shrink temperature.

Such a heat-shrinkable composite foil of the invention can be provided for any desirable application. It can be equipped with auxiliary devices, such as, for example, with closure devices along the longitudinal edges in accordance with the application of use.

Other advantages and features of the invention will be readily apparent from the following description of the preferred embodiments, the drawings and claims.

BRIEF DESCRIPTION OF THE DRAWINGS

FIG. 2 is a perspective view of a composite foil section wherein the individual planar foils are directly joined to one another with firm adhesion;

FIG. 3 is a perspective view of a composite foil section wherein the joining or bonding means is introduced between the individual planar layers; and FIG. 4 is a perspective view illustrating the use of the heat-shrinkable composite foil of the present invention wrapped around a longitudinally extending article.

DESCRIPTION OF THE PREFERRED EMBODIMENTS

Figure 1:
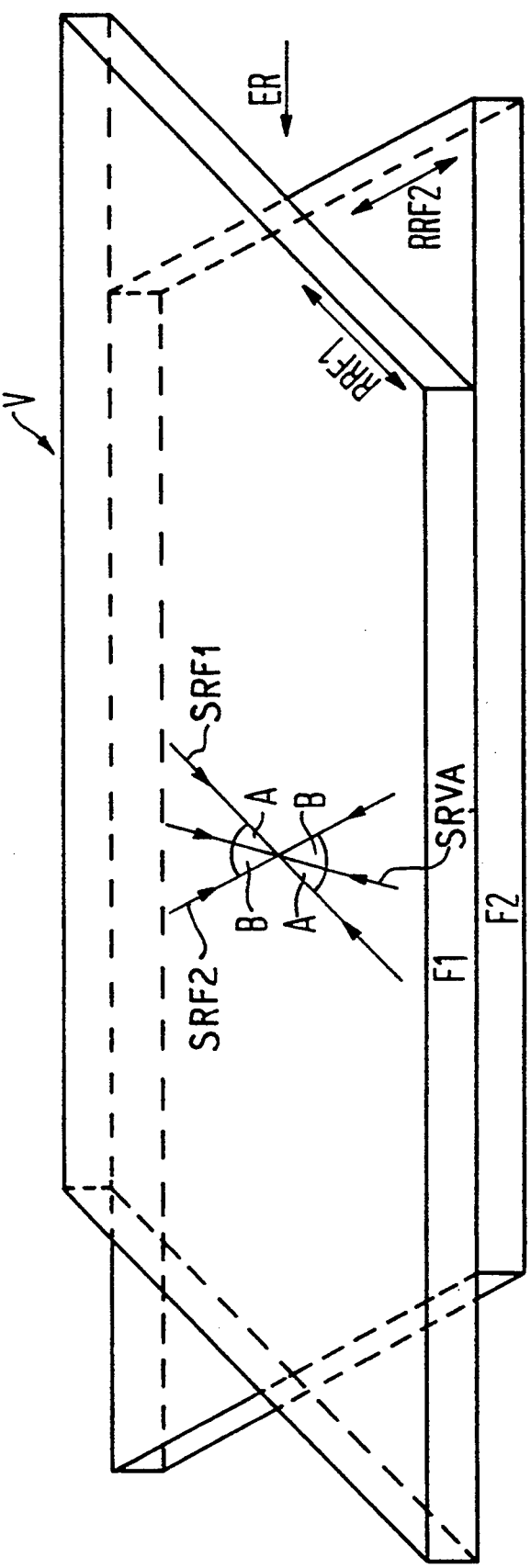
FIG. 1 is a perspective view of a fundamental structure of a heat-shrinkable composite foil of the present invention.

The fundamental principles of the present invention are particularly useful when incorporated into the composite foil, generally indicated at V in FIG. 1. The composite foil V is formed by two shrinkable planar foils F1 and F2 that are extruded, crosslinked and stretched in a known way and then placed on top of one another and joined or bonded to one another with a firm adhesion. What is decisive, however, is that the two shrinkable planar foils are placed on one another so that their stretching directions RRF1 and RRF2, respectively, and, thus, their shrink directions SRF1 and SRF2, as well, lie at an angle A + angle B relative to one another. Viewed over the two planar foils F1 and F2 firmly adhering to one another, a resultant shrink direction SRVA, thus, occurs and lies between the two individual shrink directions SRF1 and SRF2.

A heat-shrinkable foil V having a resultant shrink direction SRVA is, thus, produced. Since the tendency toward tearing or, respectively, continued tearing in the shrink direction is greater in a direction extending perpendicular to the shrink direction, the invention is based on the idea that the corresponding composite foil sections VA (see FIG. 2) are fabricated from the manufactured composite foil V, whose resultant shrink direction SRVA proceeds in the desired shrink direction so that the tendency toward tearing or, respectively, continued tearing is then, again, greatest in the direction ER extending perpendicular to the resultant shrink direction SRVA. This, however, means that. the shrink directions SRF1 and SRF2 of the individual planar foils F1 and F2 proceed at an angle vis-a-vis the principal tearing direction ER and, thus, the tendency toward tearing or, respectively, continued tearing in the individual planar foils is reduced to such a far-reaching extent that the composite foil must be considered nearly tear-resistant, at least in the area of the shrink temperatures. The mutual offset angle A+angle B should, therefore, be less than 90°, but can be equal to 90°. The intrinsically undesired shrinking in the longitudinal direction will increase, given larger offset angles.

The degree of shrinking can be identical for both planar foils F1 and F2, however, different degrees of shrinkage can also be utilized, whereby the offset angle of the two planar foils with respect to the resultant shrink direction then changes. As a result thereof, a corresponding angular offset of the resultant shrink direction SRVA then occurs for the desired composite foil V. The basic principal, however, is preserved when the composite foils sections VA are manufactured so that the principal direction of tearing or, respectively, continued tearing then, also, again, proceeds perpendicular vis-a-vis the resultant shrink direction of the composite foil section.

As illustrated in FIG. 2, a composite foil section VA has been manufactured from the overall composite foil V according to the basic principle of the present invention. The foil section VA was cut so that one edge L1 proceeds parallel to the resultant shrink direction SRVA of the composite foil VA. What is, thus, achieved is that it is mainly the dimension L1 of the composite foil section that is shortened during shrinking, whereas the second dimension L2 which extends substantially perpendicular to the resultant shrink direction SRVA, is largely preserved. This composite foil section VA is, thus, suitable as a shrinkable envelope that is placed around an article and can be shrunk thereon by heating. Since the tendency toward tearing or, respectively, continued tearing is also developed here to extend perpendicular relative to the resultant shrink direction SRVA, it is also valid here that the composite foil section composed of the planar foils F1 and F2 is largely tear-resistant as a consequence of their shrink directions SRF1 and SRF2 proceeding at offset angles A or B respective to the edge L1.

The connection between the individual planar foils F1 and F2 that also adheres firmly at shrink temperatures occurs in this exemplary embodiment, either by pressing the planar foils F1 and F2 together at elevated temperatures or in that the boundary surface of the two planar foils F1 and F2 are moistened with a crosslinking agent that reacts during pressing so that the two planar foils F1 and F2 are bonded or joined to one another with firm adhesion. Peroxide or other suitable connecting agents are particularly suitable for this purpose.

In FIG. 3, an exemplary embodiment of the invention is illustrated, wherein the condition with respect to the structure of the composite foils already set forth in FIG. 2 are valid, however, differing therefrom, the firmly adhering connection between the two planar foils F1 and F2 merely occurs with the joining agent or means for bonding VF that is introduced therebetween as an intermediate layer. This intermediate layer VF can be, for example, a polymer layer, preferably an ethylene vinyl acetate (EVA). This intermediate layer can also be composed of a reaction glue or, respectively, a reaction hot-melt.

It is also indicated that further planar foils can be applied as layers, for example planar foils composed of a known hot-melt glue or adhesive, for example a layer ZS. In the same way, however, additional shrinkable planar foils can also be applied to the foils F1 and F2, the shrinking property being capable of being influenced in many ways therewith such as by having mutual offset shrink directions.

FIG. 4 shows an applied example of one of the above-described shrinkable composite foil sections. Thus, for example, the longitudinal edges L2 that are not subject to the shrinking are provided with closure elements or ridges VS, which, for example, have undercut beads. These ridges or undercut beads are held together with the assistance of a clamp-like rail S after the article has been enveloped. Even longer, uncut articles, for example cables or cable connections, can be covered in this way. After the envelope, generally indicated at U, has been closed, the shrinking occurs by applying heat so that the article is enveloped in a sealed fashion. It is also indicated in FIG. 4 that the resultant shrink direction SRVA of the envelope U formed of the planar foils F1 and F2 proceeds in the direction of the edge L1, so that the diameter diminished during shrinking. As a consequence of providing the individual foils F1 and F2, the tendency toward tearing or, respectively, continued tearing in a longitudinal direction of the envelope, which is perpendicular to the shrink direction SRVA, is reduced to the farthest-reaching extent.

It should be pointed out that the planar foils can have either identical shrinking conditions or they may have different shrinking conditions. The planar foils can be composed of conventional shrinkable materials, an example being polyethylene. These foils can be crosslinked in a conventional manner by irradiation or by a chemical crosslinking process. Further examples of the materials that can be used are set forth in greater detail in the above-mentioned U.S. Patent.

Although various minor modifications may be suggested by those versed in the art, it should be understood that we wish to embody within the scope of the patent granted hereon all such modifications as reasonably and properly come within the scope of our contribution to the art.

We claim:

1. A heat-shrinkable tear-resistant composite foil for manufacturing tear-resistant envelopes for use in surrounding pipes, cables, cable connections and the like, said composite foil consisting of a shrinkable continuous planar first foil shrinkable in a first shrink direction and a shrinkable continuous planar second foil shrinkable in a second shrink direction, said first and second foils being bonded together with the second shrink direction of the second foil deviating from the first shrink direction of the first foil by an offset angle, said angle being ≦90° so that the composite foil will have a resultant shrink direction lying between the shrink directions of the first and second foils.

2. A heat-shrinkable tear-resistant composite foil according to claim 1, wherein composite foil sections each having a longitudinal edge are cut out from the composite foil so that said longitudinal edge extends parallel to the resultant shrink direction.

3. A heat-shrinkable tear-resistant composite foil according to claim 1, wherein the planar foils comprise identical degrees of shrinkage.

4. A heat-shrinkable tear-resistant composite foil according to claim 1, wherein the planar foils have different degrees of shrinkage.

5. A heat-shrinkable tear-resistant composite foil according to claim 1, wherein the planar foils are composed of polyethylene.

6. A heat-shrinkable tear-resistant composite foil according to claim 1, wherein said first and second foils are bonded together by crosslinking the planar foils by irradiation.

7. A heat-shrinkable tear-resistant composite foil according to claim 1, wherein the first and second planar foils are bonded together by chemical crosslinking.

8. A heat-shrinkable tear-resistant composite foil according to claim 1, wherein the first and second planar foils are bonded together by applying pressure at an elevated temperature.

9. A heat-shrinkable tear-resistant composite foil according to claim 8 wherein the first and second foils are bonded together by a chemical crosslinking with connecting agent including peroxide.

10. A heat-shrinkable tear-resistant composite foil according to claim 1, wherein said first and second foils are bonded together by adhesive arranged in a boundary surface between the first and second foils, said adhesive reacting in a crosslinking fashion on the boundary surface of the planar foils during pressing.

11. A heat-shrinkable tear-resistant composite foil according to claim 10, wherein the adhesive is a polymer layer disposed between the first and second foils, said polymer layer being crosslinked when the first and second foils are pressed together.

12. A heat-shrinkable tear-resistant composite foil according to claim 1, wherein the first and second foils are bonded together by an adhesive layer of a material selected from a group consisting of a reaction glue and a reaction hot-melt, said layer being disposed between the first and second foils.

13. A heat-shrinkable tear-resistant composite foil according to claim 1, further consisting of additional planar foils having, respectively, mutual offset shrink directions bonded to the bonded first and second foils.

14. A heat-shrinkable tear-resistant composite foil according to claim 1, wherein a foil section is manufactured from the composite foil with two longitudinal edges extending substantially perpendicular to the resultant shrink direction, said two longitudinal edges being brought together into mutual engagement after the foil section has been wrapped as an envelope around an article to be enveloped.

15. A heat-shrinkable tear-resistant composite foil according to claim 15, wherein the two longitudinal edges are provided with beads for accepting fastening means for gripping the edges together after wrapping.

16. A heat-shrinkable tear-resistant composite foil for manufacturing tear-resistant envelopes for use in surrounding pipes, cables, cable connections and the like, said composite foil consisting of only a first foil being a shrinkable continuous planar foil having a first shrink direction, a second foil being a shrinkable continuous planar foil having a second shrink direction, and means for bonding the first and second foils together with the second shrink direction of the second foil deviating from the first shrink direction of the first foil by an offset angle ≦90° so that the composite foil has a resultant shrink direction lying between the first and second shrink directions.

17. A heat-shrinkable tear-resistant composite foil according to claim 16, wherein a foil section is manufactured from the composite foil with two longitudinal edges extending substantially perpendicular to the resultant shrink direction, said two longitudinal edges being brought together into mutual engagement after the foil section has been wrapped as an envelope around an article to be enveloped.

18. A heat-shrinkable tear-resistant composite foil according to claim 17, wherein the two longitudinal edges are provided with beads for accepting fastening means for gripping the edges together after wrapping.

* * * * *